May 7, 1935. H. R. GRAYBILL 2,000,752
ANIMAL TRAP
Filed Sept. 13, 1934 4 Sheets-Sheet 1

INVENTOR
Hershey Roy Graybill
BY
Louis Prevost Whitaker
ATTORNEY

May 7, 1935. H. R. GRAYBILL 2,000,752
ANIMAL TRAP
Filed Sept. 13, 1934 4 Sheets-Sheet 2
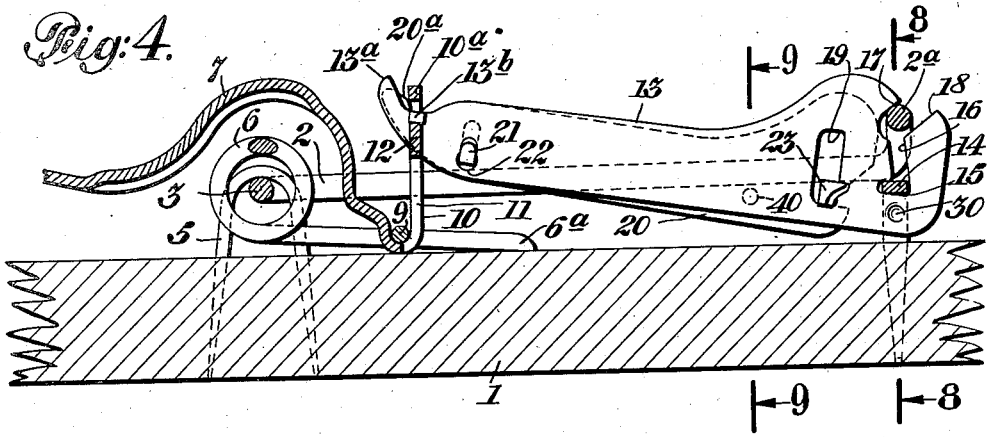
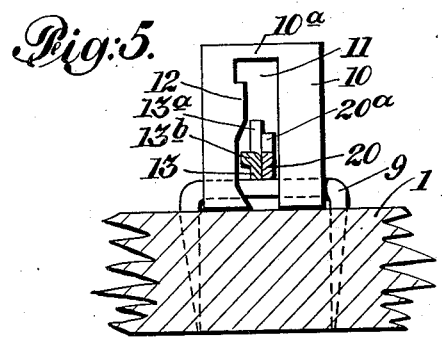
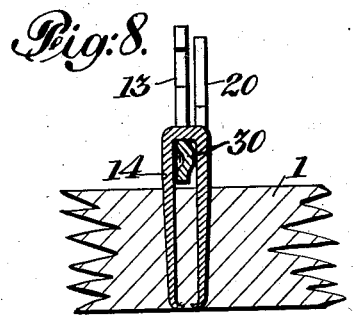
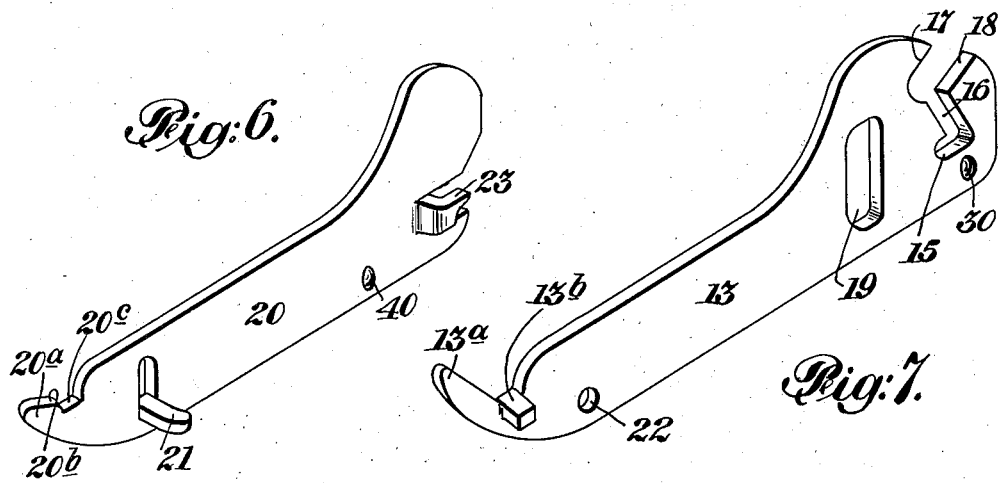
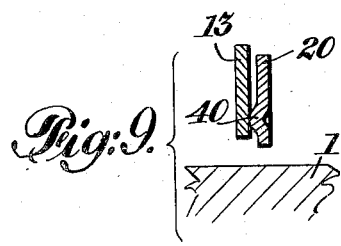
INVENTOR
Hershey Roy Graybill
BY
ATTORNEY

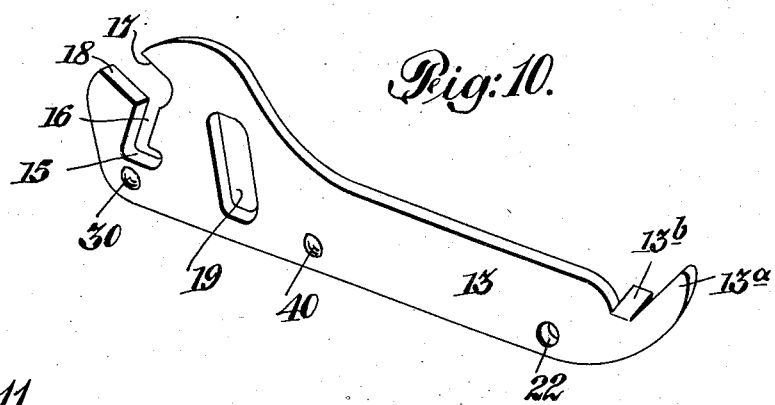
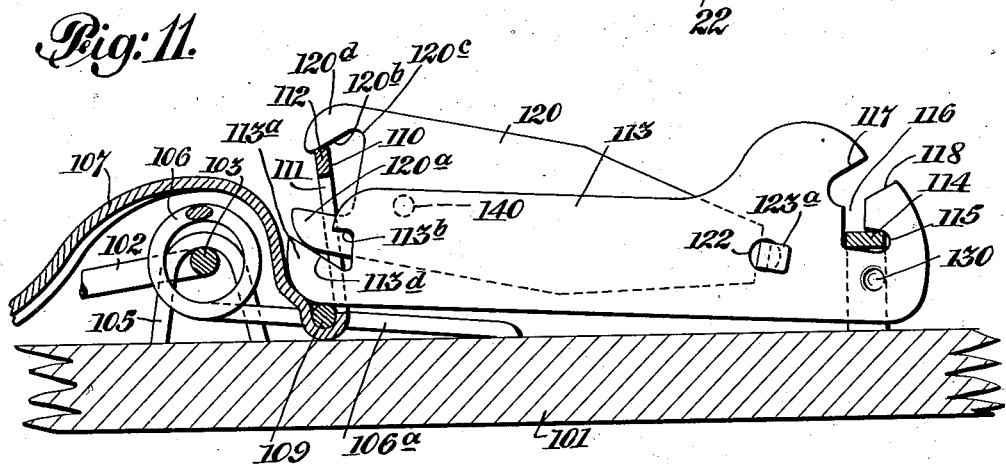
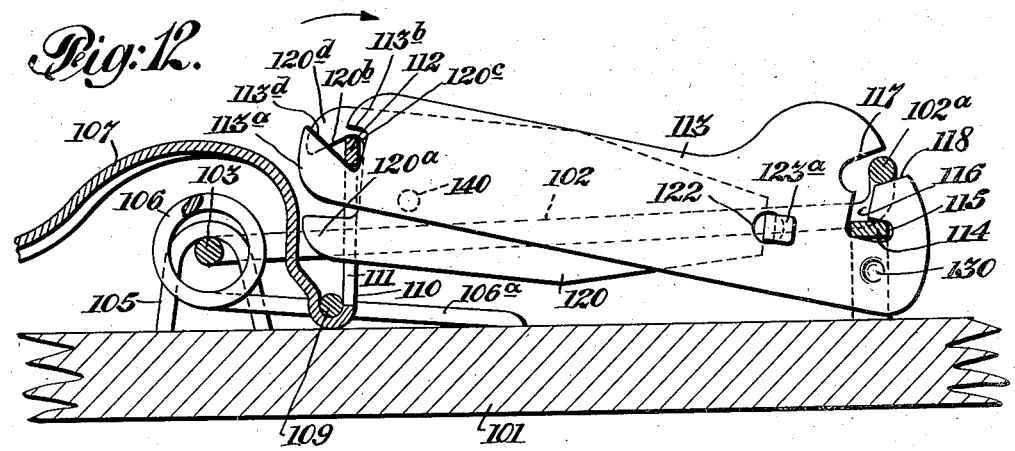

May 7, 1935.  H. R. GRAYBILL  2,000,752
ANIMAL TRAP
Filed Sept. 13, 1934  4 Sheets-Sheet 4

INVENTOR
Hershey Roy Graybill
BY
Louis Prescott Whitaker
ATTORNEY

Patented May 7, 1935

2,000,752

UNITED STATES PATENT OFFICE 2,000,752

ANIMAL TRAP

Hershey Roy Graybill, Lititz, Pa., assignor to Animal Trap Company of America, Lititz, Pa., a corporation of Pennsylvania Application September 13, 1934, Serial No. 743,795

10 Claims. (Cl. 43—83)

My invention consists in the novel features hereinafter described, reference being had to the accompanying drawings which show several embodiments of the invention, selected by me for purposes of illustration, and the said invention is fully disclosed in the following description and claims.

The object of my invention is to provide a cheap and efficient trap, intended more particularly for mice, rats and other small animals, which will be automatically set by simply swinging the pivoted striker or jaw from the released to the set position, and is an improvement on the trap disclosed in the prior application of Hershey Roy Graybill, Melvin B. Koch and Harry W. McCreary, filed May 22, 1934 and given Serial No. 726,890, now Patent No. 1,979,223, issued October 30, 1934.

Referring to the accompanying drawings,

Fig. 4 is a view similar to Fig. 3 showing the parts in set position.

Fig. 5 is a partial transverse sectional view of Fig. 2 on line 5—5 looking in the direction of the arrows.

Fig. 6 is a detail perspective view of the counterweighted setting lever.

Fig. 7 is a detail perspective view of the locking bar.

Fig. 8 is a detail cross sectional view through the locking bar and its pivotal support, showing the rear edge of the setting lever in elevation.

Fig. 9 is a similar section through the locking bar and setting lever, intermediate their ends.

Fig. 10 is a detail perspective of the locking bar, illustrating a slight modification.

Fig. 11 is a partial view similar to Fig. 2, showing my invention embodied in a modified form of trap.

Fig. 12 is a partial view similar to Fig. 3, of the trap, shown in Fig. 10.

Referring to the embodiment of my invention illustrated in Figs. 1 to 10 inclusive, the trap includes the usual base, 1, ordinarily of wood, although it may be made of metal or other suitable material, the striker or jaw, 2, in this instance shown as formed in one piece and having a pivot rod, 3, integral with one arm extending through an eye on the other arm, the pivot rod being pivotally connected to the base, in this instance by staples, 5, and the striker being provided with the usual spring, 6, which in this instance is a single spring surrounding the pivot rod and having its end portions, 6a and 6b, engaging respectively the base and an arm of the striker. 7 is a bait pedal having a bait holding portion, 8, and pivotally connected to the base by a staple, 9, in rear of which the bait pedal is provided with an upwardly extending arm, 10, provided with a vertical slot, 11, from one side of which, near the upper end of the slot, a transversely disposed projection, 12, extends inwardly and forms the trigger of the trap. 13 is the locking bar provided at its rear end with a pivotal aperture, 15, to engage a staple, 14, the locking bar having an open slot, 16, extending upwardly and forwardly from the pivotal aperture and then at an angle rearwardly, the opposite edges of the slot forming the locking shoulder or detent, 17, and the setting shoulder, 18, respectively, for engaging the cross bar, 2a, of the striker. At its forward end the locking bar is provided with a guiding portion, 13a, extending through the slot, 11, in the bait pedal, and having a transversely projecting trigger engaging arm, 13b.

Figure 1:
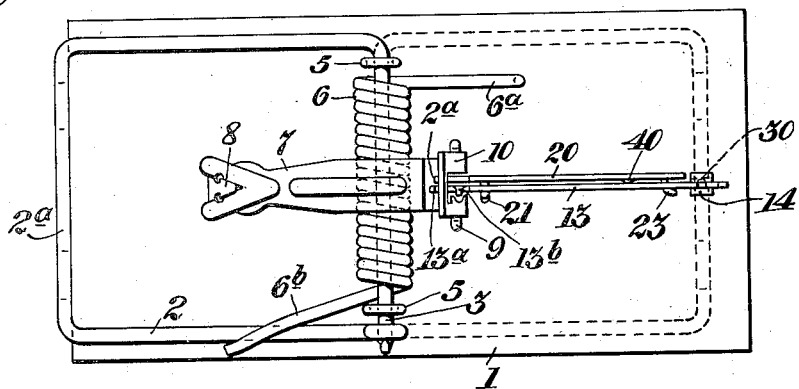
Fig. 1 represents a top plan view of a trap embodying my invention in the released position.
Figure 2:
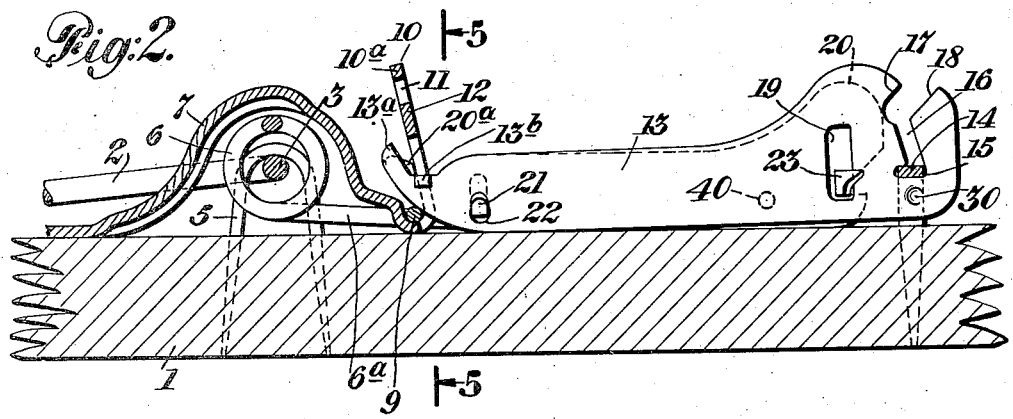
Fig. 2 is a partial side elevation of the trap.
Figure 3:
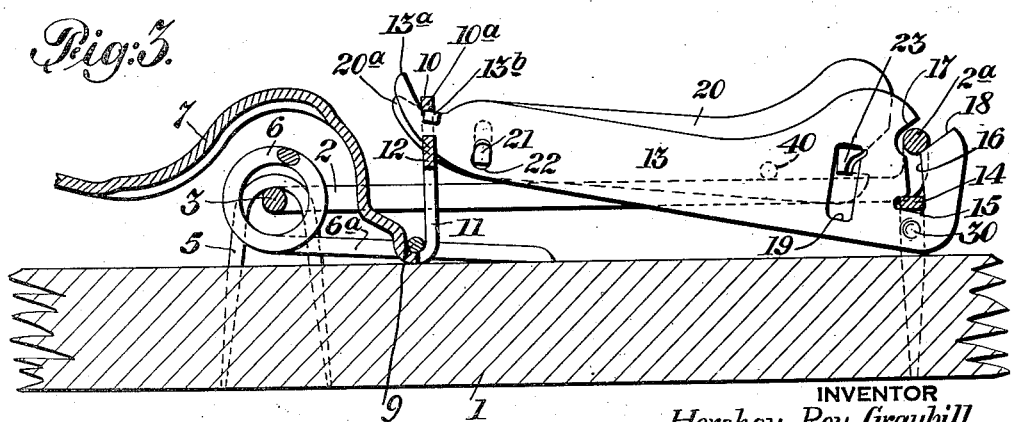
Fig. 3 is a partial longitudinal section of the trap showing the parts in an intermediate position, with the striker swung over into engagement with the locking blade to automatically set the trap, but before the striker is released by the operator.

20 is a counterweighted setting lever, in this instance pivoted adjacent to its forward end to the locking bar, as shown, by means of a struck up projection, 21, on the setting lever engaging a pivotal aperture, 22, in the locking bar, and said parts are guidingly connected adjacent to their rear ends, in this instance by a struck up projection, 23, on the setting lever engaging a slot, 19, in the locking bar in such manner as to hold the parts together while permitting the setting lever to rise and fall with respect to the locking bar, rotating on the pivotal connection, 21—22. The forward end of the setting lever has a guiding portion, 20a, extending through the slot, 11, of the bait pedal and provided with a notch, 20c, the forward edge of which constitutes a cam, 20b, arranged to engage the part, 10a, of the part 10 of the bait pedal above the slot, 11, when the forward end of the locking bar is elevated in setting the trap, and rock the setting lever on its pivotal connection with the locking bar as indicated in Fig. 3, while the trigger engaging portion, 13b, of the locking bar is carried above the trigger, 12. This position of the parts is effected by simply swinging the striker over into engagement with the setting shoulder, 18, of the locking bar and pressing downwardly thereon as shown in Fig. 3. The movement of the locking bar has also brought the detent, 17, above the cross bar, 2a, of the striker. When the striker is released by the operator, the cross bar, 2a, will rise into engagement with the detent, 17, as indicated in Fig. 4, and at the same time the counterbalance portion of the setting lever, in rear of its pivotal connection will drop, due to the release of the upward pressure of the locking bar transmitted through its pivotal connection, 21, and this will rock the cam portion, 20b, rearwardly, carrying the trigger, 12, of the bait pedal directly beneath the trigger engaging portion, 13b, which comes to rest upon it, thus setting the trap.

The general construction and arrangement of parts hereinbefore described is set forth in the prior application before referred to, and is not broadly claimed herein.

I will now describe the features which constitute my present invention.

In order to secure uniformly efficient operation of a trap of this kind, it is very desirable that the parts shall move as accurately as possible, and without undue friction, it being understood that such traps must be capable of being manufactured so as to be sold very cheaply, and accurate machine bearings being prohibitively expensive.

Figure 15:
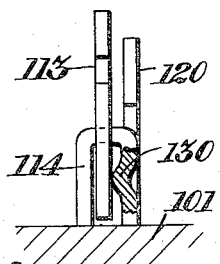
Fig. 15 is a view similar to Fig. 8 showing a modification.

The simplest form of pivotal support for the locking bar is a staple, the cross piece of which extends through a pivotal aperture in the locking bar, while the legs of the staple are pressed or driven into the base. Such a pivotal connection has a tendency to permit the locking bar to wabble, and this might in some instances, prevent or impede the accurate functioning of the parts. I prefer to form the staple of flat stock as shown, and to make the space between the legs of the staple slightly wider than the thickness of the locking bar, which is preferably stamped or otherwise formed of sheet metal. If the legs of the staple were so close together that both legs tightly engaged the sides of the locking bar, the resulting friction would interfere with the operation of the parts. I therefore provide the locking bar on one face, and preferably below and closely adjacent to the pivotal aperture, 15, with a projecting lug, 30, so disposed that it will engage the inner face of one leg of the staple in all positions which the locking bar can assume, with respect to its pivotal connection with the base. This lug, 30, may be round, square, oblong or of any other desired shape, and with a flat or curved outer surface, but I prefer to make it round, and in the form of a segment of a sphere or a cone, so that it has an extremely small bearing surface reduced, in fact, to a single point in engagement with the adjacent leg of the staple. I also prefer to make this lug, 30, of such height that it holds the opposite face of the locking bar in easy guiding engagement with the opposite leg of the staple, thus securing a very satisfactory pivotal connection substantially free from wabbling. The lug, 30, may be formed in any suitable manner, but I prefer to form it by embossing, or in other words, indenting one face of the locking bar and pressing the indented metal thereof outwardly on the opposite face to form the lug. Obviously, it would be within the scope of my invention to provide the lug on the inner face of one leg of the staple at a point adjacent to the cross bar as indicated in Fig. 15, but it is more practical to form it on a face of the locking bar which is my preferred form.

I also provide the contiguous faces of the locking bar and setting lever with a spacing and anti-friction means located at a distance from their pivotal connection with each other which separates these two faces, thus preventing the two flat faces from rubbing together. This is preferably accomplished by providing one of said parts with a projection, which engages the contiguous face of the other. The projection may be of any desired shape or form having a contacting surface of small area and preferably rounded to further reduce its contacting surface. It is preferably made in the form of a segment of a sphere or a cone so that it reduces the frictional contact between it and the face of the other part to a single point, and reduces the friction between said parts to a minimum. While this projection may be formed in any desired way, I prefer to form it by embossing it in the metal of either the locking bar or the setting lever, so that it projects toward the contiguous surface of the other part.

In the embodiment of my invention shown in Figs. 1 to 10 inclusive, this spacing and anti-friction projection is shown at 40, as located on the inner face of the setting lever, at a considerable distance from the pivotal projection, 21, that is to say, adjacent to the rear end of the setting lever, and is in the form of an embossed or indented projection in the form of a segment of a sphere, and contacting with the inner face of the locking lever. Obviously, it might be formed on the inner face of the locking lever and contact with the inner face of the setting lever.

Obviously, by constructing the trap as shown in Figs. 1 to 10, the result is an extremely quick and easy operation in setting the trap, to which both the projections, 30 and 40, contribute, while the projection, 40, performs the further important function of holding both the locking bar, and the setting lever pivotally connected therewith, in accurate relation to the pivotal support for the locking bar, with a minimum of friction at that point, and without materially increasing the cost of the parts, or the labor in assembling them.

In Figs. 11 to 14, inclusive, I have shown another embodiment of the invention, in which the parts corresponding with those in Figs. 1 to 10 are given the same reference characters with the addition of 100.

In this embodiment, the counterweighted setting lever, 120, is pivotally connected to the locking bar, 113, adjacent to the rear end of the locking bar, instead of at its forward end, and is provided at its forward end with a downwardly extending cam edge, 120b, to engage the upright portion of the bait pedal. The locking bar is provided adjacent its rear end with a pivotal aperture, 122, engaged by an inwardly and rearwardly bent projection, 123a, which can be inserted in aperture, 122, thus forming the pivotal connection between the parts. The locking bar is pivotally supported at its rear end by the staple, 114, in the same manner as previously described, and is provided with the projection, 130, engaging the inner face of one leg of the staple. The forward end of the locking bar has a portion, 113a, extending through the slot, 111, in the upright portion of the bait pedal, an inclined cam portion, 113d, for tipping the bait pedal in setting the trap, and a trigger engaging portion, 113b, to engage the trigger, 112, which is the part of the upright portion of the bait pedal above the slot, 111. The forward end of the setting lever is also provided with a guiding portion, 120a, extending through the slot, 111, and above this guiding portion the setting lever is provided with a notch or recess, 120c, above which is a projecting portion, 120d, the lower edge of which is inclined and forms a cam, 120b, resting upon the trigger when the trap is in released position (Fig. 11) and holding the setting lever in raised position with respect to the locking bar.

Figure 14:
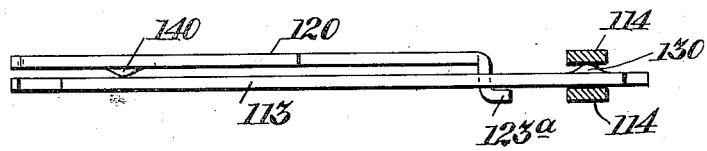
Fig. 14 is a top plan view of the locking bar and setting lever of the trap shown in Figs. 11, 12 and 13.

In this embodiment, the general arrangement of which is disclosed in the prior application above referred to, and which is not broadly claimed herein, the spacing and anti-friction lug or projection, 140, is located on the inner face of the locking lever, and is shown as indented or embossed therein as a segment of a sphere in a direction toward the contiguous face of the setting lever with which it contacts at a single point as clearly shown in Fig. 14.

Figure 13:
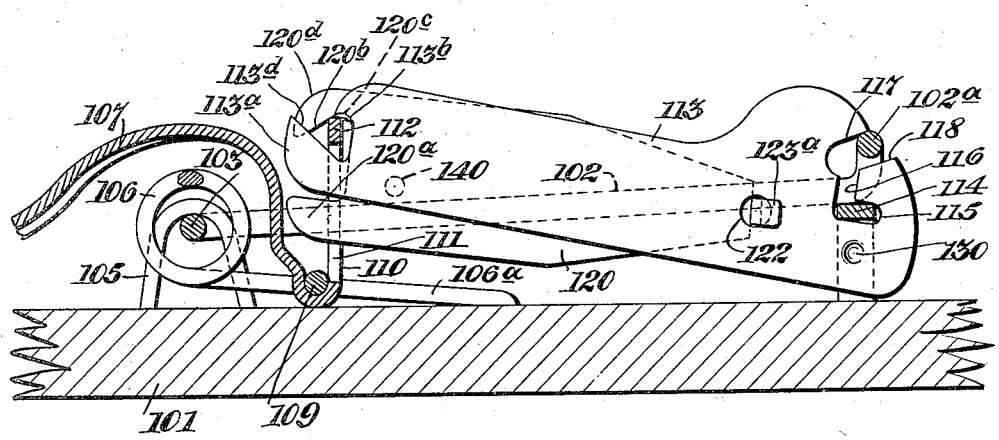
Fig. 13 is a partial view similar to Fig. 4 of the trap shown in Figs. 11 and 12, in set position.

The operation of this embodiment differs slightly from that previously described, in that when the striker is brought into engagement with the setting shoulder, 118, of the locking lever, the cam portion, 113d, of the locking bar engages the lower edge of the trigger and rocks the bait pedal rearwardly in the direction of the arrow (Fig. 12) carrying the trigger beneath the trigger engaging portion, 113b, of the locking bar. As the trigger moves rearwardly, the cam edge, 120b, of the setting device slides down on the trigger as shown in Fig. 12, allowing the setting lever to drop, the friction between this cam edge and the trigger holding the trigger in operative relation with the trigger engaging portion, 113b, of the locking bar which drops upon the trigger when the striker is released, as shown in Fig. 13, thus completing the setting of the trap.

This form of trap can be released only by a downward movement of the bait carrying portion of the bait pedal.

The projections, 130 and 140, contribute to the ease and accuracy of movement of the locking bar and setting lever in the same manner as described with respect to the embodiment previously described.

Figure 16:
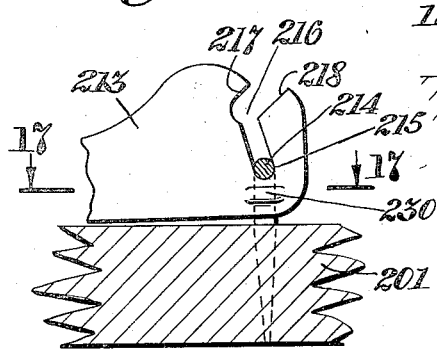
Fig. 16 is a detail of a part of a locking bar and the staple forming its pivotal support, showing a further modification.
Figure 17:
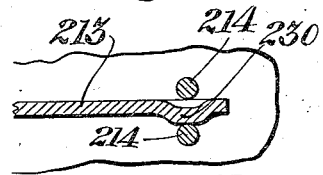
Fig. 17 is a section on line 17—17 of Fig. 16.

In Figs. 16 and 17 I have shown a slight modification of the means for pivotally supporting the locking bar. In these figures the staple, 214, is formed of round wire or stock, so that the inner faces of its legs are curved. The locking bar, 213, is constructed as previously described, except that it is provided on one face adjacent to the pivotal aperture, 215, with a lateral projection, 230, pressed or otherwise formed, and which is preferably oblong or square, and has its outer surface parallel with the face of the locking bar, and preferably extending slightly on opposite sides of its point of contact with the adjacent leg of the staple, the inner face of which it frictionally engages. As the curved face of the staple leg engages the flat outer face of the projection, 230, the friction is reduced to substantially a single point and the locking bar is held from wabbling, without materially increasing the friction between it and the staple.

What I claim and desire to secure by Letters Patent is:

1. A trap comprising a base, a spring actuated striker pivoted thereto, a pivoted bait pedal having a portion provided with a trigger, a locking bar provided with a pivotal aperture and a setting shoulder, and locking detent for engaging the striker and a trigger engaging portion, a staple engaging the pivotal aperture of the locking bar, one of the contiguous faces of said locking bar and one leg of said staple being provided with a projection located adjacent to said aperture, and at all times contacting with the other of said contiguous faces.

2. A trap comprising a base, a spring actuated striker pivoted thereto, a pivoted bait pedal having a portion provided with a trigger, a locking bar provided with a pivotal aperture and a setting shoulder and locking detent for engaging the striker and a trigger engaging portion, a staple engaging the pivotal aperture of the locking bar, said locking bar being provided on one face adjacent to said pivotal aperture with a projection, having an outwardly curved face at all times in contact with the contiguous inner face of one leg of said staple.

3. A trap comprising a base, a spring actuated striker pivoted thereto, a pivoted bait pedal having a portion provided with a trigger, a locking bar provided with a pivotal aperture and a setting shoulder and locking detent for engaging the striker and a trigger engaging portion, a staple engaging the pivotal aperture of the locking bar, one of the contiguous faces of said locking bar and one leg of said staple being provided with a projection having a curved face at all times in contact with the other of said contiguous faces.

4. A trap comprising a base, a spring actuated striker pivoted thereto, a pivoted bait pedal having a portion provided with a trigger, a locking bar provided with a pivotal aperture and a setting shoulder and locking detent for engaging the striker and a trigger engaging portion, a staple engaging the pivotal aperture of the locking bar, said locking bar being provided adjacent to said aperture with an embossed projection, the outer face of which is in the form of a segment of a sphere, contacting at all times at a single point with the contiguous face of one leg of said staple.

5. A trap comprising a base, a spring actuated striker pivoted thereto, a pivoted bait pedal provided with a trigger, a locking bar pivoted to the base and provided with a setting shoulder and a locking detent for engaging the striker and a trigger engaging portion, and a setting lever operatively connected with the locking bar and having a portion engaging the bait pedal to hold the trigger in operative relation with the trigger engaging portion of the locking bar until the trigger is engaged thereby, one of said operatively connected parts having a cam portion for positively raising the bait pedal to bring the trigger into operative relation with the locking bar, one of the contiguous faces of the locking bar and setting device being provided with a spacing and anti-friction projection having a portion of small area engaging the other of said contiguous faces.

6. A trap comprising a base, a spring actuated striker pivoted thereto, a pivoted bait pedal provided with a trigger, a locking bar pivoted to the base and provided with a setting shoulder and a locking detent for engaging the striker and a trigger engaging portion, and a setting lever pivotally connected with said locking bar, and having a portion for engaging the bait pedal to hold the trigger in operative relation with the trigger engaging portion of the locking bar, one of the contiguous faces of said locking bar and setting lever being provided with a spacing and anti-friction projection located at a distance from the pivotal connection between said parts and having a surface of small area in frictional contact with the other of said contiguous faces.

7. A trap comprising a base, a spring actuated striker pivoted thereto, a pivoted bait pedal provided with a trigger, a locking bar pivoted to the base and provided with a setting shoulder and a locking detent for engaging the striker and a trigger engaging portion, and a setting lever pivotally connected with said locking bar, and having a portion for engaging the bait pedal to hold the trigger in operative relation with the trigger engaging portion of the locking bar, one of said pivotally connected parts being provided with a cam portion for engaging a part connected with the bait pedal to bring the trigger into operative relation with the trigger engaging portion of the locking bar, said locking bar and setting lever having contiguous faces one of which is provided with a spacing and anti-friction projection located at a distance from the pivotal connection between said parts and having a curved outer surface for frictionally engaging the other of said contiguous faces.

8. A trap comprising a base, a spring actuated striker pivoted thereto, a pivoted bait pedal provided with a trigger, a locking bar pivoted to the base and provided with a setting shoulder and a locking detent for engaging the striker and a trigger engaging portion, and a setting lever pivotally connected with said locking bar, and having a portion for engaging the bait pedal to hold the trigger in operative relation with the trigger engaging portion of the locking bar, one of said pivotally connected parts being provided with a cam portion for engaging a part connected with the bait pedal to bring the trigger into operative relation with the trigger engaging portion of the locking bar, said locking bar and setting lever having contiguous faces one of which is provided with a spacing and anti-friction projection located at a distance from the pivotal connection between said parts and being in the form of a segment of a sphere, the outer surface of said projection contacting at a single point with the other of said contiguous faces.

9. A trap comprising a base, a spring actuated striker pivoted thereto, a pivoted bait pedal having a portion provided with a trigger, a locking bar having a pivotal aperture, a setting shoulder and locking detent for engaging said striker, and a trigger engaging portion, a setting lever pivoted to the locking bar and having a portion for engaging the bait pedal to hold the trigger in operative relation with the trigger engaging portion of the locking bar, one of said pivotally connected parts being provided with a cam for engaging the bait pedal and bringing the trigger into operative relation with the locking bar, a staple engaging the pivotal aperture of the locking bar and secured to the base, said locking bar having a projection on one face, adjacent to said pivotal aperture, at all times in contact with the inner face of one leg of said staple, and said locking bar and said setting lever having contiguous faces one of which is provided with a spacing and anti-friction projection located at a distance from the pivotal connection between said parts and engaging the other of said contiguous faces.

10. A trap comprising a base, a spring actuated striker pivoted thereto, a pivoted bait pedal having a portion provided with a trigger, a locking bar having a pivotal aperture, a setting shoulder and locking detent for engaging said striker, and a trigger engaging portion, a setting lever pivoted to the locking bar and having a portion for engaging the bait pedal to hold the trigger in operative relation with the trigger engaging portion of the locking bar, one of said pivotally connected parts being provided with a cam for engaging the bait pedal and bringing the trigger into operative relation with the locking bar, a staple engaging the pivotal aperture of the locking bar and secured to the base, said locking bar having a projection on one face, adjacent to said pivotal aperture, having its outer surface in contact at all times at substantially a single point with the inner face of one leg of said staple and said locking bar and said setting lever, having contiguous faces one of which is provided with a projection located at a distance from the pivotal connection between said parts and having substantially a single point in its outer face in contact with the other of said contiguous faces.

HERSHEY ROY GRAYBILL.